US009141958B2

(12) United States Patent
Iyer (10) Patent No.: US 9,141,958 B2
(45) Date of Patent: Sep. 22, 2015

(54) METHOD FOR PROVIDING DATA TO A USER (71) Applicant: Trimble Navigation Limited, Sunnyvale, CA (US)

(72) Inventor: Prakash Iyer, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 218 days.

(21) Appl. No.: 13/627,524

(22) Filed: Sep. 26, 2012

(65) Prior Publication Data

US 2014/0089466 A1 Mar. 27, 2014

(51) Int. Cl.
*G06F 15/16* (2006.01)
*G06Q 30/00* (2012.01)
*G06Q 10/00* (2012.01)
*H04L 12/24* (2006.01)

(52) U.S. Cl.
CPC .............. *G06Q 30/016* (2013.01); *G06Q 10/20* (2013.01); *H04L 41/5061* (2013.01)

(58) Field of Classification Search
CPC ....................................................... G06F 15/16
USPC ......................................... 709/219, 225, 207
See application file for complete search history.

(56) References Cited

U.S. PATENT DOCUMENTS

| 7,421,448 | B2 | 9/2008 | Spork et al. |
| 8,095,381 | B2 | 1/2012 | Simons et al. |
| 8,095,551 | B2 | 1/2012 | Kountz et al. |
| 8,185,606 | B2* | 5/2012 | Sampang et al. ............. 709/217 |
| 2006/0168125 | A1* | 7/2006 | Leo Spork ..................... 709/219 |
| 2007/0043688 | A1* | 2/2007 | Kountz et al. ..................... 707/1 |
| 2009/0161963 | A1* | 6/2009 | Uusitalo et al. ............... 382/203 |
| 2009/0217149 | A1* | 8/2009 | Kamien et al. ................ 715/230 |
| 2009/0240521 | A1* | 9/2009 | Simons et al. ..................... 705/2 |
| 2009/0300500 | A1* | 12/2009 | Arrasvuori .................... 715/723 |
| 2010/0023507 | A1* | 1/2010 | Kim et al. .......................... 707/5 |
| 2010/0250304 | A1* | 9/2010 | Whitaker et al. .................. 705/7 |
| 2011/0072047 | A1* | 3/2011 | Wang et al. .................... 707/776 |
| 2013/0015968 | A1* | 1/2013 | Hogg ............................ 340/521 |
| 2013/0031453 | A1* | 1/2013 | Griffiths et al. .............. 715/230 |
| 2013/0204734 | A1* | 8/2013 | Norris et al. ................. 705/26.5 |

* cited by examiner

*Primary Examiner* — Jude Jean Gilles (57) ABSTRACT

An example method for providing a user with service technical data is provided. A server stores original service technical data and annotated data in a server where the annotated data is associated with the original service technical data. The server determines an access level of the user such where the access level of the user determines what service technical data may be sent. A portion of the service technical data is sent from the server to a device associated with the user, based at least in part on the access level of the user. The server also receives additional annotated data generated by the user where the additional annotated data is associated with the original service technical data.

30 Claims, 11 Drawing Sheets

```
┌─────────────────────────────────────────────┐
│ REQUEST, AT A DEVICE ASSOCIATED WITH A USER,│
│   THE SERVICE TECHNICAL DATA FROM A SERVER  │
│                     510                     │
└─────────────────────────────────────────────┘
                      ↓
┌─────────────────────────────────────────────┐
│  PROVIDE, AT THE DEVICE ASSOCIATED WITH THE │
│ USER, INFORMATION ASSOCIATED WITH THE USER  │
│      TO THE SERVER FOR AUTHENTICATION       │
│                     520                     │
└─────────────────────────────────────────────┘
                      ↓
┌─────────────────────────────────────────────┐
│    RECEIVE, AT THE DEVICE ASSOCIATED WITH   │
│   THE USER, AT LEAST A PORTION OF THE       │
│   SERVICE TECHNICAL DATA BASED ON THE       │
│              AUTHENTICATION                 │
│                     530                     │
└─────────────────────────────────────────────┘
                      ↓
┌─────────────────────────────────────────────┐
│ SEND, AT THE DEVICE ASSOCIATED WITH THE USER,│
│ ANNOTATED DATA GENERATED BY THE USER TO THE │
│                   SERVER                    │
│                     540                     │
└─────────────────────────────────────────────┘
                      ↓
┌─────────────────────────────────────────────┐
│  COMMUNICATIVELY CONNECT A SECOND USER TO   │
│                   THE USER                  │
│                     550                     │
└─────────────────────────────────────────────┘
                      ↓
┌─────────────────────────────────────────────┐
│       PROVIDE A SECOND USER WITH A MAP      │
│                     560                     │
└─────────────────────────────────────────────┘
                      ↓
┌─────────────────────────────────────────────┐
│       PROVIDE THE FIRST USER WITH A MAP     │
│                     570                     │
└─────────────────────────────────────────────┘
```

REQUEST, AT A DEVICE ASSOCIATED WITH A USER, ORIGINAL SERVICE TECHNICAL DATA AND ANNOTATED DATA FROM A SERVER
610

PROVIDE INFORMATION ASSOCIATED WITH THE USER TO THE SERVER FOR AN AUTHENTICATION
620

RECEIVE AT LEAST A PORTION OF THE ORIGINAL SERVICE TECHNICAL DATA AND THE ANNOTATED DATA AT THE DEVICE ASSOCIATED WITH THE USER BASED AT LEAST IN PART ON AN AUTHENTICATION OF THE USER
630

COMMUNICATIVELY CONNECT A SECOND USER TO THE USER
640

PROVIDE A SECOND USER WITH A MAP
650

PROVIDE THE FIRST USER WITH A MAP
660

METHOD FOR PROVIDING DATA TO A USER

BACKGROUND

Mobile devices such as smart phones or tablets are becoming increasingly popular amongst technicians that service equipment in the field. Mobile devices comprise numerous computing functionalities, such as email readers, web browsers, and video recorders. Mobile devices are often used for downloading books and videos as well. Today, many mobile devices comprise video cameras and microphones to provide users with the ability to communicate face-to-face.

BRIEF DESCRIPTION OF THE DRAWINGS

The accompanying drawings, which are incorporated in and form a part of this specification, illustrate and serve to explain the principles of embodiments in conjunction with the description. Unless specifically noted, the drawings referred to in this description should be understood as not being drawn to scale.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

NOTATION AND NOMENCLATURE

Some portions of the description of embodiments which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present discussions terms such as "storing", "determining", "sending", "connecting", "providing", "requesting", "receiving", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Furthermore, in some embodiments, methods described herein can be carried out by a computer-usable storage medium having instructions embodied therein that when executed cause a computer system to perform the methods described herein.

Overview of Discussion

Example techniques, devices, systems, and methods for providing data to a user are described herein. Discussion begins with an example system architecture wherein a user requests data from a server. A discussion of an example server architecture is then described. Discussion continues with an example system for annotating data. Next, examples of additional system functions are described. Discussion continues with example methods of use. Lastly, an example electronic environment is described.

Example System Architecture

Figure 1:
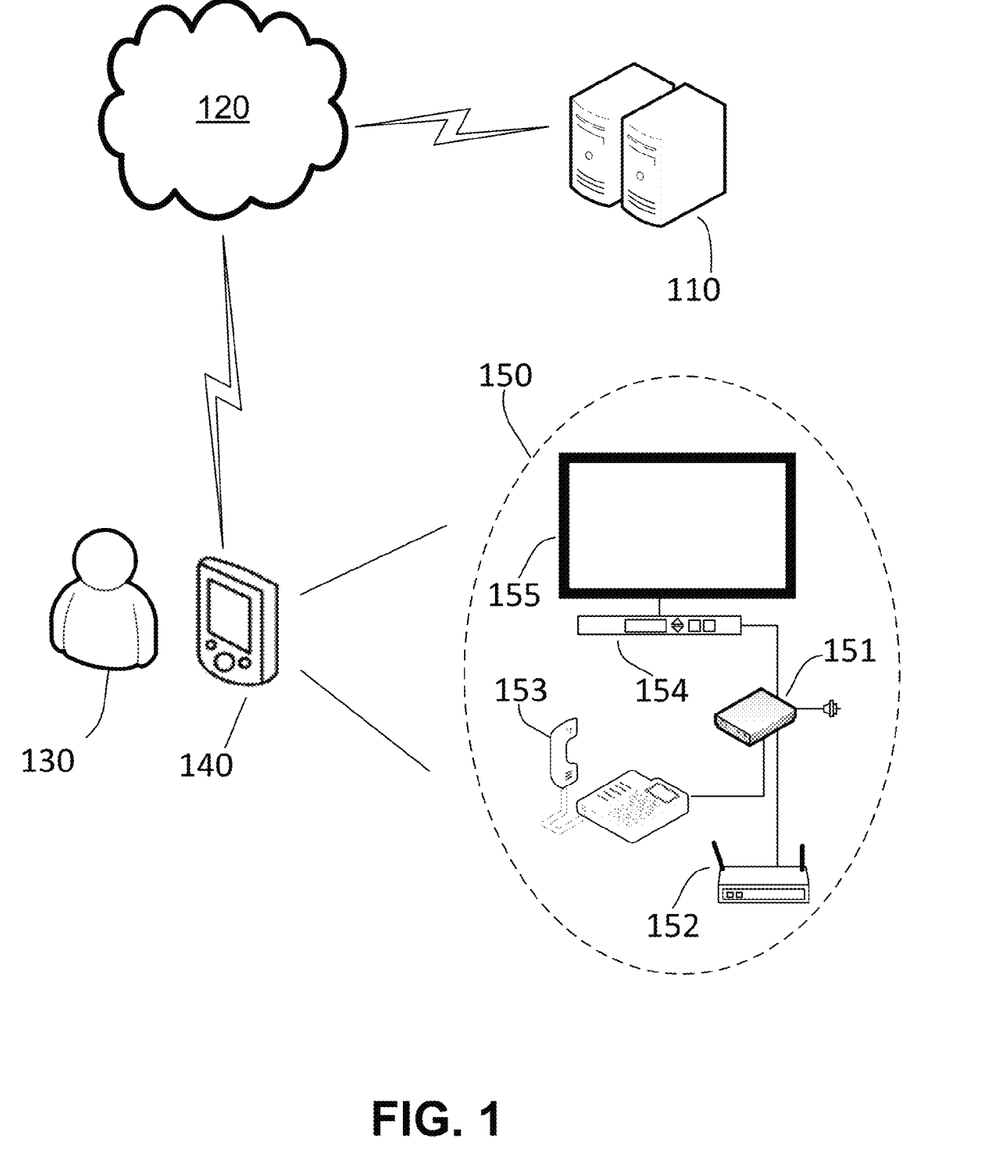
FIG. 1 shows an example system upon which embodiments may be implemented.

FIG. 1 shows an example system architecture in accordance with one embodiment. FIG. 1 includes server 110, network 120, user 130, mobile device 140, and apparatus 150.

In one embodiment, user 130 is a technician that installs or repairs apparatus 150. Moreover, it should be understood that a user 130 may be a mechanic, an electrician, a plumber, a chef, a carpenter, a doctor, a construction worker, etc. Further, user 130 may be a person who does not use the devices, systems, and methods described herein to assist with their profession.

Often times there is a high turnover, or churn, rate within fields that require technically trained users 130. Due to this high turnover rate, some technically trained users 130 may not be trained to install or repair every type of problem/system. In some professions, such as a surgeon, the amount of knowledge user 130 must possess is so vast that it would be difficult to memorize everything user 130 must know to successfully perform a task. Whether in the field or at a place of business, user 130 may not always have the information required to perform a particular task such as repairing or installing apparatus 150. However, in one example, mobile device 140 allows user 130 to request information about apparatus 150 from server 110 such that user 130 can install or repair apparatus 150.

Apparatus 150, in one example, includes modem 151, router 152, telephone 153, cable box 154, and television 155. In some embodiments apparatus 150 may include a satellite dish (not shown) or an electrical system (not shown), etc.

Moreover, it should be understood that apparatus 150 may be any type of apparatus 150 that user 130 can install, repair, upgrade, build, prepare, cook, manufacture, or the like. For instance, apparatus 150 may include, but is not limited to: a cable and communication system as shown in FIG. 1, a household appliance (e.g., a refrigerator, washing machine, toaster, etc.), a furnace, an air-conditioner, an HVAC system, an automobile, an airplane, a ship, any type of vehicle, an electrical system within a building or external from a building, heavy machinery, pluming within a building or external from a building, food, electronics, etc.

In some embodiments, user 130 enters a request for service technical data 247 (of FIG. 2) with mobile device 140. Mobile device 140 may include, but is not limited to: a cell phone, a lap-top computer, a tablet computing device, a smart-phone, a personal digital assistant, an enterprise mobile device, etc. In an embodiment, mobile device 140 communicates with server 110 through network 120. In some embodiments, network 120 may comprise the Internet, a local area network, a wide area network, a wireless local area network, etc. In one embodiment, when server 110 receives a request server 110 identifies the type of mobile device 140 it is communicating with. As such, in one embodiment server 110 may optimize/render data such that latency is reduced when data is sent to mobile device 140. In an embodiment an application programming interface (API) is provided for rendering data. In one embodiment, server 110 may be updated such that it recognizes new devices and can download their codecs from an external source such as external systems 260 (of FIG. 2). In some embodiments, mobile device 140 is wired.

Figure 2:
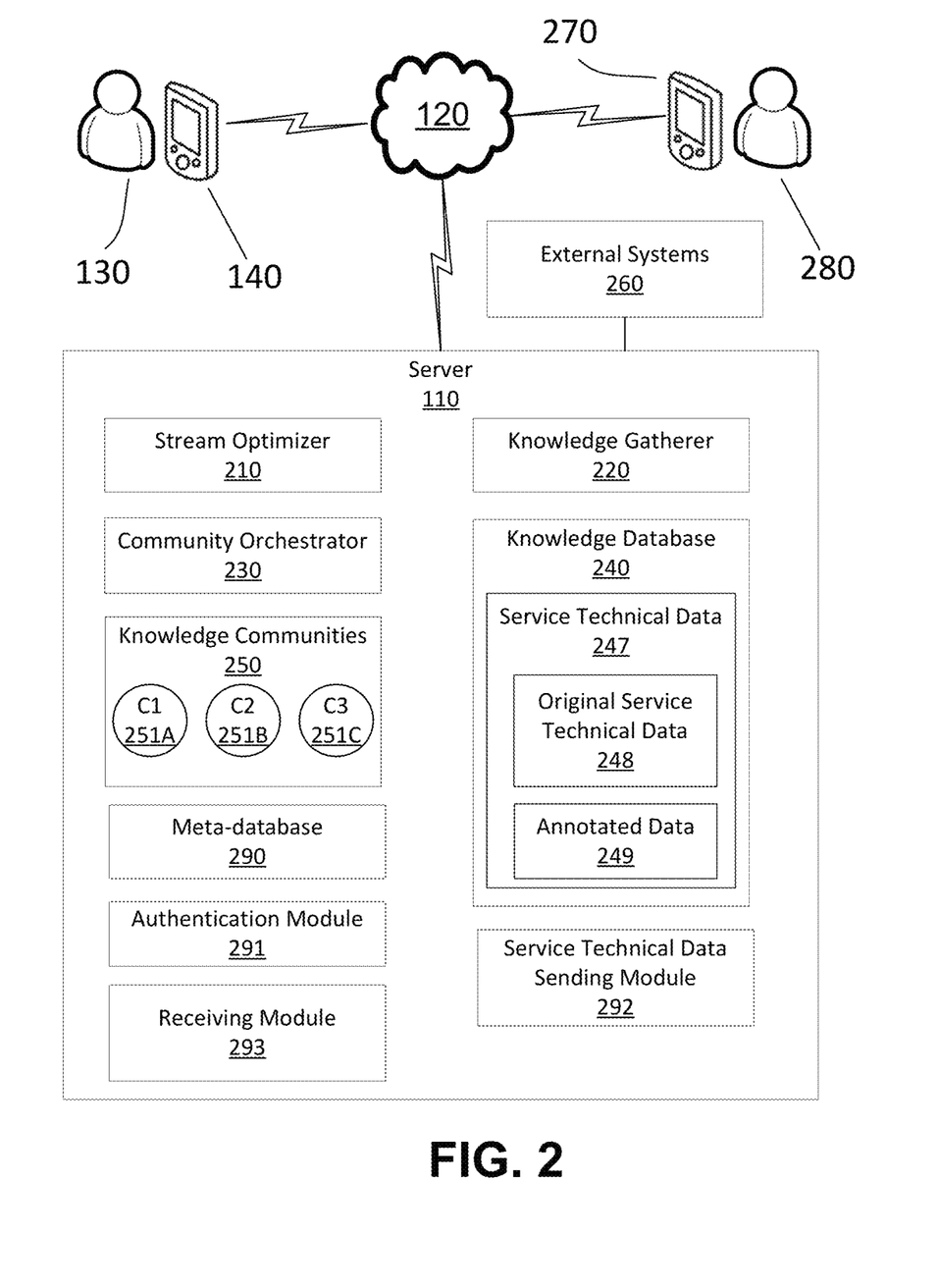
FIG. 2 shows an example block diagram in accordance with embodiments.

In one embodiment, service technical data 247 refers to data that assists user 130 with a task they are attempting to perform. In one embodiment, service technical data 247 can take two forms: original service technical data 248 and annotated data 249. Original service technical data 248 includes, but is not limited to: any type of manual, instructions, guide, handbook, image, video, audio, or other information that is created by an entity other than a user 130 such as a product manufacturer or service company. For example, original service technical data 248 may comprise a manual on how to install a particular type of apparatus 150. In some embodiments original service technical data 248 may comprise a guide on how to troubleshoot and/or repair the electronics in an appliance such as a refrigerator, spa, or internet router 152. In one example, original service technical data 248 may be an instructional video created by a manufacturer of a particular tool. Annotated data 249, as will be discussed later, includes data/notes created by a user 130 to explain or add to information provided by original service technical data 248. Regardless of its type, service technical data 247 may be stored in a database within server 110.

Figure 3A:
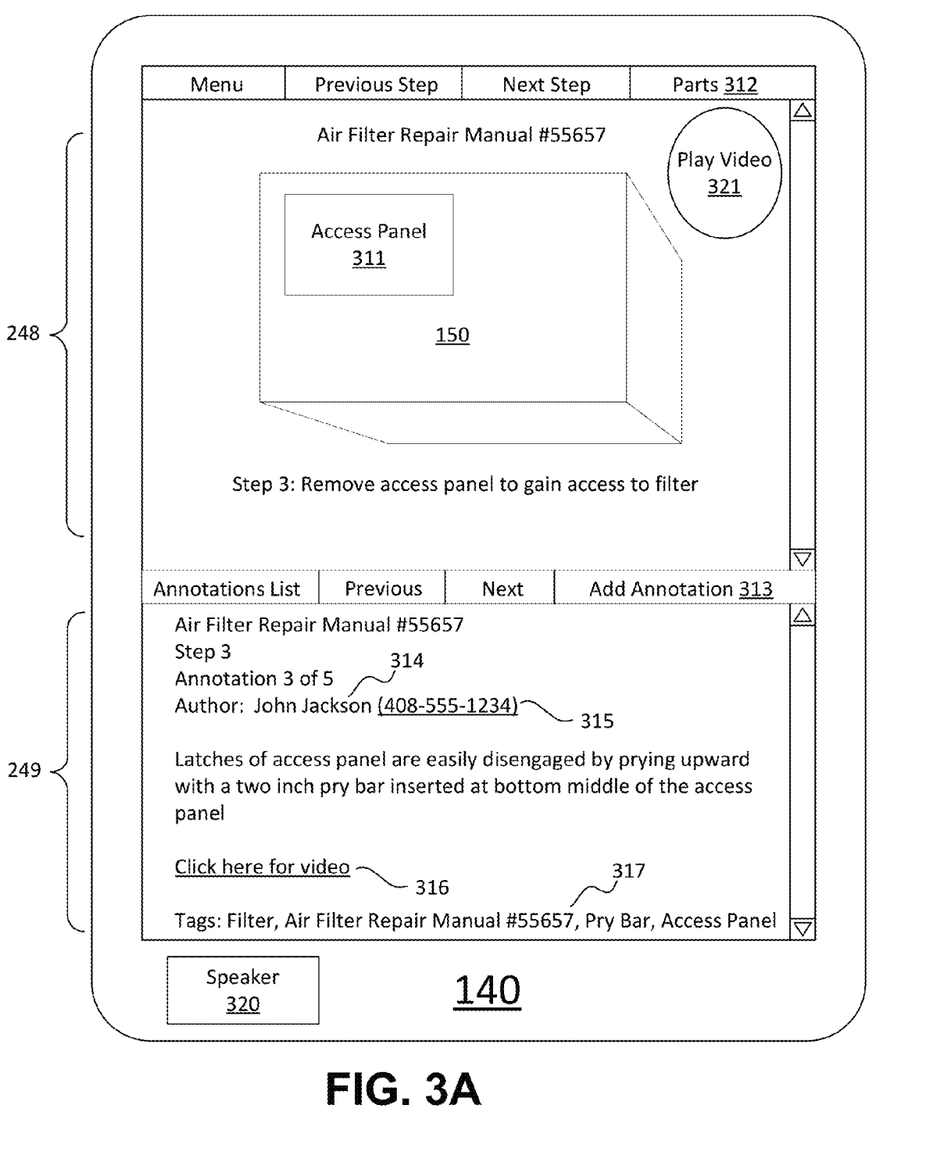
FIG. 3A is an example diagram of a mobile device in accordance with one embodiment.

FIG. 3A shows an example mobile device 140 displaying both original service technical data 248 and annotated data 249. In the embodiment shown in FIG. 3A, mobile device 140 comprises a speaker 320. In this example, the screen of mobile device 140 is split into halves, where the top half displays original service technical data 248 and the bottom half displays annotated data 249. In this example, original service technical data 248 is shown as step 3 of an air filter repair manual. In this example apparatus 150 comprises an access panel 311. In an embodiment, user 130 may access a list of annotations, or view each annotation sequentially. In the example shown in FIG. 3A, the annotated data 249 provides user 130 with information related to the annotated data 249 such as what original service technical data 248 the annotated data 249 corresponds with, how many items of annotated data 249 exist (e.g., annotation 3 of 5), the name 314 of the author of the annotation, contact information 315 for the author of the annotation, text explaining how to open the access panel, links to video 316 and 321, and tags 317 under which the annotation may be categorized. In an embodiment, a user 130 may search tags 317 to find more information about a pry bar, a filter or an access panel. Note that this is an example, and more or less annotated data 249 may be displayed in a given embodiment.

In one embodiment, user 130 may access information associated with parts associated with original service technical data 248. In an embodiment, a user 130 clicks on a parts button 312. In an embodiment, information about how to order a part appears after clicking on button 312. In one embodiment, a map of where to buy parts, also referred to as a map of stores 351 appears after clicking on button 312. In another embodiment a list of nearby users 280 appears after clicking on button 312. Note that these are examples and a user 130 can access information associated with parts from other screens as well such as a main menu, for example.

As will be discussed below, in one embodiment a user 130 may add an annotated data 249 by clicking on an add annotation button 313. In other embodiments a user 130 may add an annotation from another screen, such as the main menu for example.

In some embodiments, after a request is sent for information from a mobile device 140 associated with user 130 to server 110, authentication is performed to determine whether user 130 is permitted to view the requested information. For example, server 110 may contain a lookup table which stores a list of data that user 130 may receive (e.g., user permissions). In some embodiments a second database 290, referred to as a meta-database 290, is separate from the database comprising service technical data 247 and stores information about each user 130. In some embodiments, only one database is used to store user permissions and service technical data 247. In some embodiments, a meta-database 290 that comprises user 130 information may partition users 130 into subgroups, such that if a particular user 130 is part of a particular subgroup, user 130 may only receive the service technical data 247 that other members of the subgroup are able to receive.

In some embodiments, there may be various access levels within a subgroup which further limit or control information that a user 130 may access via server 110. Such an access level can be based upon skill level, a security clearance, a settable tag, and/or a trade certificate associated with a user 130; however, these are merely examples, and it should be appreciated that an access level may be based upon other criteria. In one embodiment access may be based on association with a particular group or level in a particular hierarchy. In some embodiments a user 130 may have an access level related to their security clearance level. In some embodiments this is referred to as role based access or permissions/user 130 permissions. In an embodiment, server 110 determines the access level of user 130. In one embodiment, mobile device 140 determines the access level of user 130. For example, if a contractor only has a secret clearance, that contractor may not be able to access top secret material. In one embodiment, the access level is based at least in part upon the skill level of a user 130. For example, if user 130 is only an apprentice and not a master in their particular trade, user 130 will not be able to access material that is only available to masters. Further, the system may comprise a backend, or another database on which user 130 or a supervisor may input metadata. In some embodiments, the metadata is collected and entered automatically.

Example Server Architecture

It should be understood that server 110 is not necessarily a single server. Server 110 may comprise a single server, a cluster of servers, a cloud computing system, a distributed computing system, or the like. In some embodiments, server 110 is not in a single physical location. In some embodiments, a portion of data may be stored on a server in a first location, while additional data is stored in a second remote location. In some embodiments server 110 may employ parallel processing to reduce latency.

In some embodiments, server 110 may send service technical data 247 to the point of service through any type of network 120 or mobile device 140. In an embodiment server 110 may detect the type of mobile device 140 connected to it. Data may be streamed or downloaded via cellular, satellite or Wi-Fi networks. In some embodiments, cryptography and/or security measures may be employed to protect data sent over network 120. For example, public key cryptography such as Diffie-Hellman or RSA may be used. Other security techniques that may be employed include sending information in the secure socket layer or the transport security layer.

FIG. 2 shows an example server 110 architecture. In some embodiments, server 110 comprises a stream optimizer 210, a knowledge gatherer 220, a community orchestration server 230, a knowledge database 240, knowledge communities 250, external systems 260, mobile device 270, user 280, meta-database 290, authentication module 291, receiving module 293, and service technical data sending module 292. In an embodiments communities 251A, 251B, and 251A are comprised within knowledge communities 250.

Stream optimizer 210, in one embodiment, renders audio and video as discussed above. In an embodiment server 110 can recognize device 140 and determine an optimized rendering.

Knowledge gatherer 220, in one embodiment, gathers knowledge from knowledge communities to best provide a user 130 with service technical data 247, a map of users 341, a map of stores 351, etc. Knowledge communities 250 include communities 251. In an embodiment these communities may be databases. In an embodiment, community 251 comprises service technical data 247. In some embodiments, community 251 may comprise annotated data 249, original service technical data 248, metadata, etc. Community 251 may comprise a technical manual, written notes related to a particular procedure, a map of users 341, a map of stores 351, contact information for nearby users 130, etc.

Community orchestration server/community orchestrator 230, in one embodiment, organizes and provides relationships between communities 251. For example, in the case that uploaded annotated data 249 must be tagged but is not tagged correctly, community orchestrator 230 may determine communities 251 that annotated data 249 should be associated with. In some embodiments community orchestrator 230 organizes communities including information including, but not limited to: the annotated data 249, user 130 contact information, user 130 location information, information about local stores and what parts the stores have in inventory, etc. In one embodiment community orchestrator 230 can access a database comprising user 130 information. In an embodiment, a community orchestrator 230 can provide user 130 with the contact information of a second user 280. In an embodiment, a community orchestrator 230 connects users 130 and 280 via their associated mobile devices 140 and 270, as discussed herein.

In an embodiment knowledge database 240 comprises a database that includes information similar to knowledge communities 250. In some embodiments users 130 may not alter data in knowledge database 240. In one embodiment only data located in knowledge communities 250 may be altered by users 130. In some embodiments, service technical data 247 is stored in knowledge database 240. In some embodiments, knowledge database 240 comprises pointers that point to service technical data 247. In an embodiment, service technical data 247 comprises original service technical data 248 and annotated data 249.

External systems 260, in one example, comprises any system that may be communicatively coupled to server 110. For example, external systems 260 may be a server or cloud that comprises information associated with local stores and their inventory, remote users 130, manufacturer information, product information, YouTube™ videos, etc.

In an embodiment, mobile device 270 allows user 280 to communicate with mobile device 140 and user 130. In an embodiment, more than two mobile devices may be communicatively connected simultaneously.

In an embodiment, meta-database 290 stores information related to the actions of users 130 or the actions performed by the mobile device 140 of a user 130 is stored in a meta-database 290. In some embodiments this meta-database 290 may comprise qualification/access levels, contact information, task lists, etc.

In an embodiment authentication module 291 authenticates users 130 to ensure that they may access service technical data 247. In one embodiment, authentication module 291 accesses information about a user 130 from meta-database 290 and determines whether user 130 has permission to receive requested data.

In an embodiment, service technical data sending module 292 sends service technical data 247 to a user 130. As discussed herein, service technical data 247 comprises original service technical data 248 and annotated data 249. In one embodiment, service technical data 247 is multimodal (i.e., both original service technical data 248 and/or annotated data 249 may be multimodal). As discussed herein, service technical data 247 includes, but is not limited to: text, audio, images, two-dimensional video, stereoscopic video, three-dimensional video, etc.

In an embodiment, receiving module 293 receives service technical data 249. In one embodiment, receiving module 293 receives annotated data 249 generated by a user 130, wherein the annotated data 249 is associated with original service technical data 247. For example, after a user 130 creates annotated data 249 and sends it to server 110, receiving module 293 receives the annotated data 249.

Example System for Annotating Data

As discussed above, mobile device 140 may receive service technical data 247. In addition to receiving original service technical data 248 and annotated data 249, user 130 may create annotated data 249 and send the annotated data 249 to be stored with other service technical data 247.

In some embodiments, mobile device 140 is used by user 130 to create annotated data 249. Annotated data 249 may be textual data, audio data, visual data, or a combination of the three. In one example, a user 130 may wish to annotate an installation manual that does not indicate the difficulty associated with performing a particular task. User 130 may send data to server 110 to annotate the manual with text and video such that when a second user 130 attempts the task and uses the same manual, that second user 130 may view read the annotated text and watch the video to gain information, explanation, or advice that the first user 130 sent to the server 110.

In some embodiments, annotated data 249 is associated with original service technical data 248 while in other embodiments it is not associated with original service technical data 248. For example, annotated data 249 created by user 130 may be associated with a particular technical manual that is stored with other original service technical data 248. In another example, annotated data 249 created by user 130 may be associated with a plurality of items stored as original service technical data 248. For example, the annotated data 249 may be associated with every router made by Netgear™, rather than a particular Netgear™ router. As another example, annotated data 249 may be associated with a particular set of tools, such as every tool made by Hilti™. In one embodiment, the annotated data 249 may be associated with a particular procedure including, but not limited to: installing plumbing, installing cable, operating on a shoulder, repairing a motor vehicle, installing a countertop, fixing a fuse box, etc.

In one embodiment, the service technical data 247 and original service technical data 248 is constantly updated and refined by incorporating annotated data 249. In one embodiment this is referred to as social networking or crowd sourcing. In one embodiment each user 130 can update original service technical data 248 or annotated data 249. In one embodiment a user 130 may access annotated data 249, but cannot edit or add annotated data 249. In one example a user 130 cannot send annotated data 249 unless they possess the requisite permissions/access.

Figure 3B:
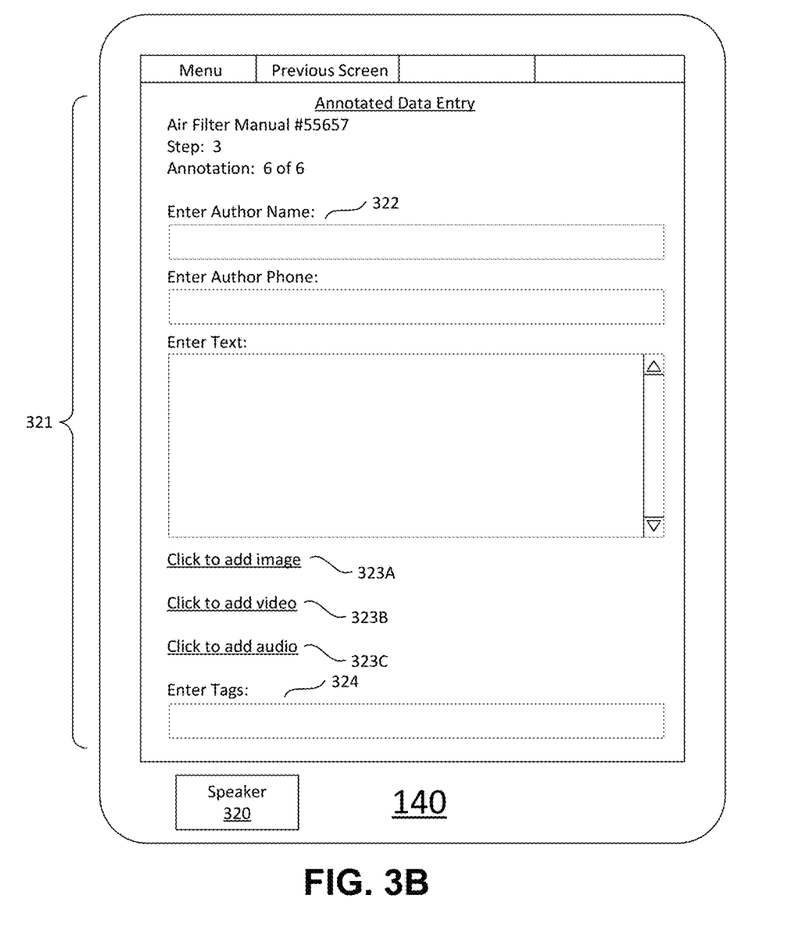
FIG. 3B is an example diagram of a mobile device in accordance with one embodiment.
Figure 7:
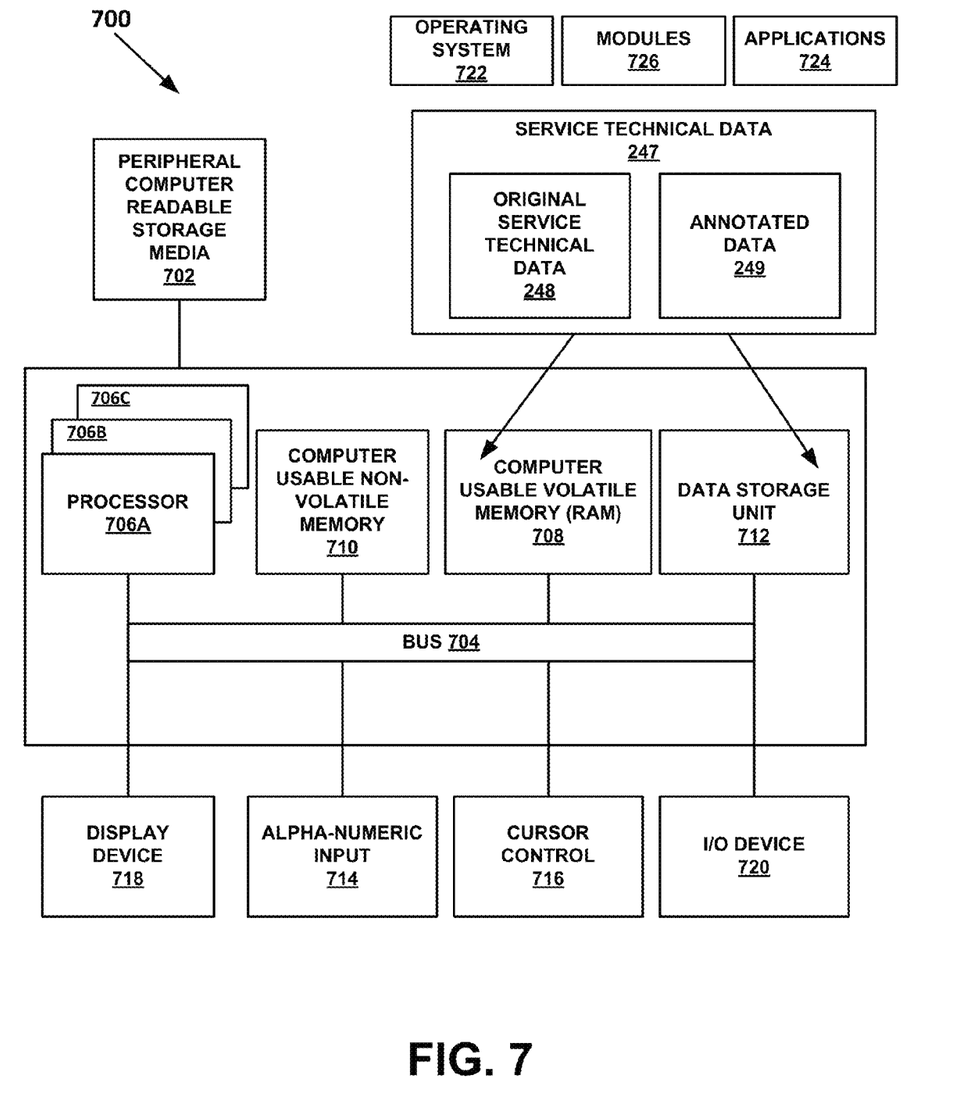
FIG. 7 is a block diagram of an example system used in accordance with one embodiment.

FIG. 3B shows an example of an annotated data entry form 321. In one embodiment, annotated data entry form 321 comprises: a name input box 322 for a user 130 to enter her name 314, at least one input box for a user to enter contact information 315 such as a phone number, an input box for text, buttons to add images 323A, video 323B, and audio 323C, and a tag input box 324 to enter tags 317. In some embodiments images, audio, and video may be captured with mobile device 140. In some embodiments, images, audio, and video may be stored in the memory 710/708/712 of mobile device 140 and uploaded to server 110 when adding annotated data 249. Note that the embodiment shown in FIG. 3B shows examples of information that may be added as annotated data 249 and that other information (not shown) may be added as annotated data 249. Moreover, annotated data entry form 321 is an example, and entering annotated data 249 may be performed by other means that may be based on the type of mobile device 140 used.

Because annotated data 249 regarding a particular item in the knowledge community 251 may grow over time, in one embodiment a user 130 is provided with the ability to sort through annotated data 249 and organize it. For example, a user 130 may have the ability to rate a particular item of annotated data 249. Next, a second user 130 may sort the annotated data 249 related to a particular item in the knowledge community 251 by the aggregate rating of that item/community 251. As other examples, a user 130 may sort the annotated data 249 by tools, dates, companies, manufacturers, areas of technology, etc.

Examples of Additional System Functions

In one embodiment users 130 must pay to access service technical data 247. For example, a user 130 (e.g., a cable company, an electrician, a supervisor, etc.) must pay per access or flat fee. In an embodiment the flat fee is a monthly or yearly subscription.

In one embodiment, users 130 may be audited. For example, a supervisor may access stored data indicating whether a particular user 130 viewed original service technical data 248 prior to starting a task. In some embodiments only a portion of users 130 (e.g., employees) may be audited by a supervisor. In other embodiments, an audit may be performed by a third party. In one embodiment audit information related to the actions of users 130 or the actions performed by the mobile device 140 of a user 130 is stored in a meta-database 290. In some embodiments this meta-database 290 may comprise qualification/access levels, contact information, task lists, etc.

Figure 3C:
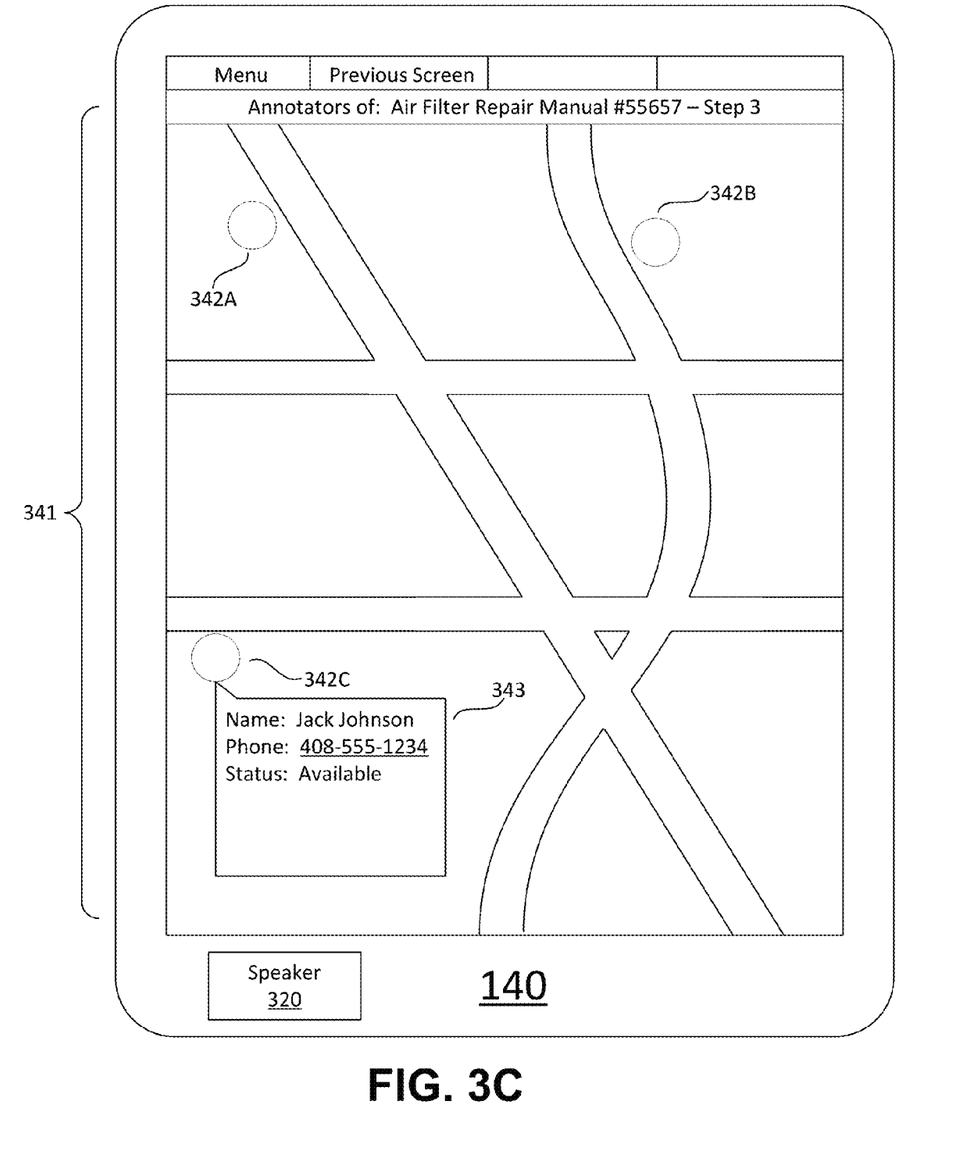
FIG. 3C is an example diagram of a mobile device displaying a map in accordance with one embodiment.
Figure 3D:
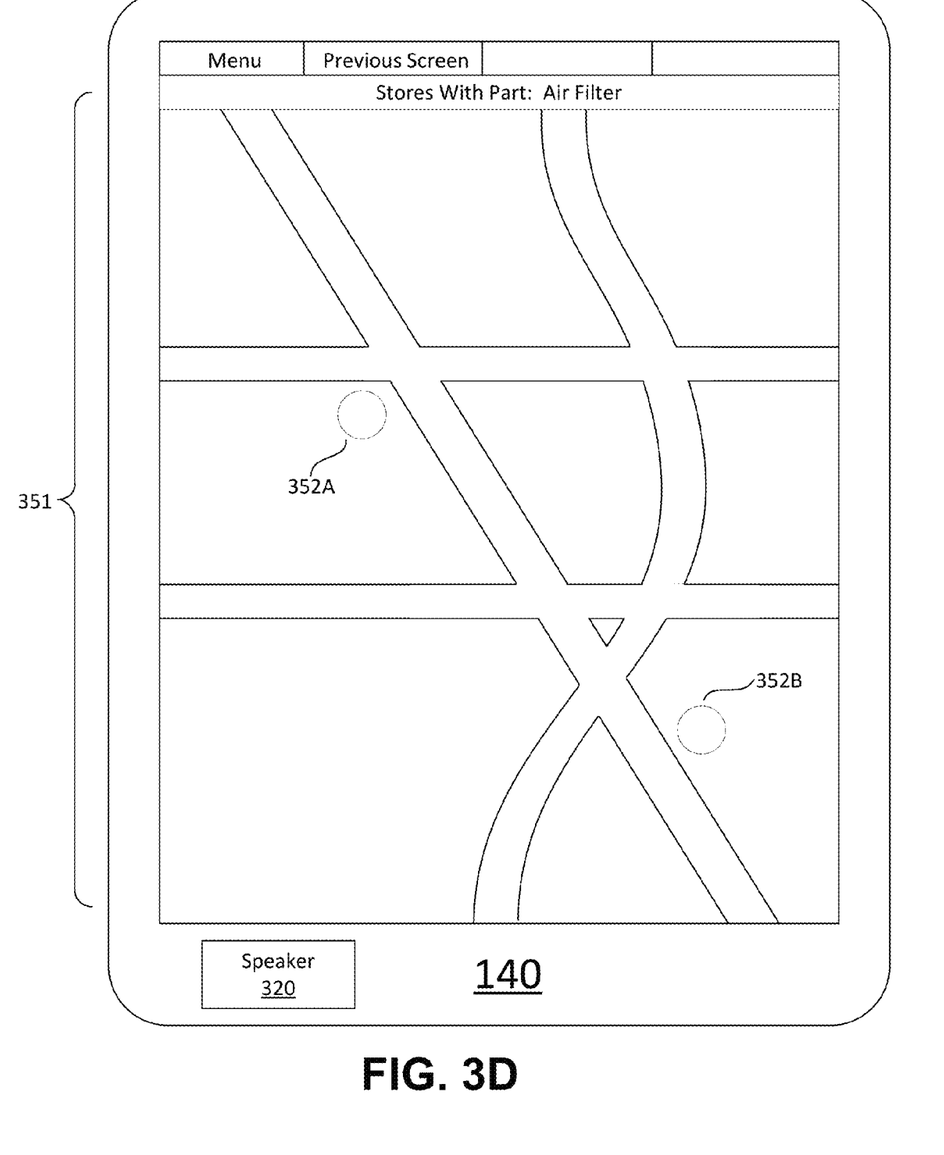
FIG. 3D is an example diagram of a mobile device displaying a map in accordance with one embodiment.

In some embodiments, a user 130 may connect to a second user 280 that uses another mobile device 270. In one embodiment, annotated data 249 may include contact information for second user 280. For example, annotated data 249 may indicate which user 280 added annotated data 249. In an embodiment each user 130 that added annotated data 249 is listed with a tag 317. A tag 317 may be associated with a user 130, service technical data 247, an apparatus 150, a type of tool, a manufacturer, a company, a particular manual, etc. In one embodiment a user 130 can interact with (e.g., clicking, hovering over, etc.) a tag 317 and information regarding that tag will appear on the screen. This information may include, but is not limited to: a website, original service technical data 247, a map of users 341, a map of stores 351, user 280 contact information, etc. In one embodiment, user 130 may command server 110 to automatically connect user 130 to second user 280. In one embodiment, server 110 may determine the types of devices 140 and 270 users 130 and 280 use. In one example after determining the types of devices 140 and 270 used by users 130 and 280, server 110 may automatically connect the two users 130 and 280 via voice, text, and/or voice and video for face-to-face chat.

In FIG. 3C a map of users 341 is shown. In an embodiment, this map of users 341 is provided on the screen of mobile device 140. In some embodiments the screen may be a touch screen. In one embodiment, the map of users 341 may comprise user symbols 342 indicating where other users 280 are located. In one embodiment the location of users 280 that annotated particular original service technical data 248 are shown on the map of users 341. In other embodiments, the location and status of any user 280 is shown. In an embodiment, a user 130 may interact with a user symbol 342C (e.g., click on, hover over, etc.). In an embodiment, when a user 130 interacts with a user symbol 342C information regarding the user 280 that is represented by user symbol 342C is displayed in a box as user information 343, for example. In some embodiments user information 343 may be shown elsewhere. It should be noted that less or additional user information 343 including, but not limited to: user expertise, time left at current assignment, contact information, etc. may be included as a part of user information 343. Further, in some embodiments user symbols 342 may be color coded to provide a status of a user 280. For example, a red user symbol 342 may indicate that a user is busy, a green user symbol 342 may indicate that a user is available, a gray or black user symbol 342 may indicate that a user is offline.

FIG. 3D shows a map of stores 351. In an embodiment the map or stores 351 shows a user 130 where a particular tool or part is located. In one embodiment, store symbols 352 are used to show the location of stores. In some embodiments, stores may include, but are not limited to: warehouses, other users 280 that have a particular tool or part, or a tool/part/vehicle itself that is tracked using global positioning system technology, etc.

Figure 3E:
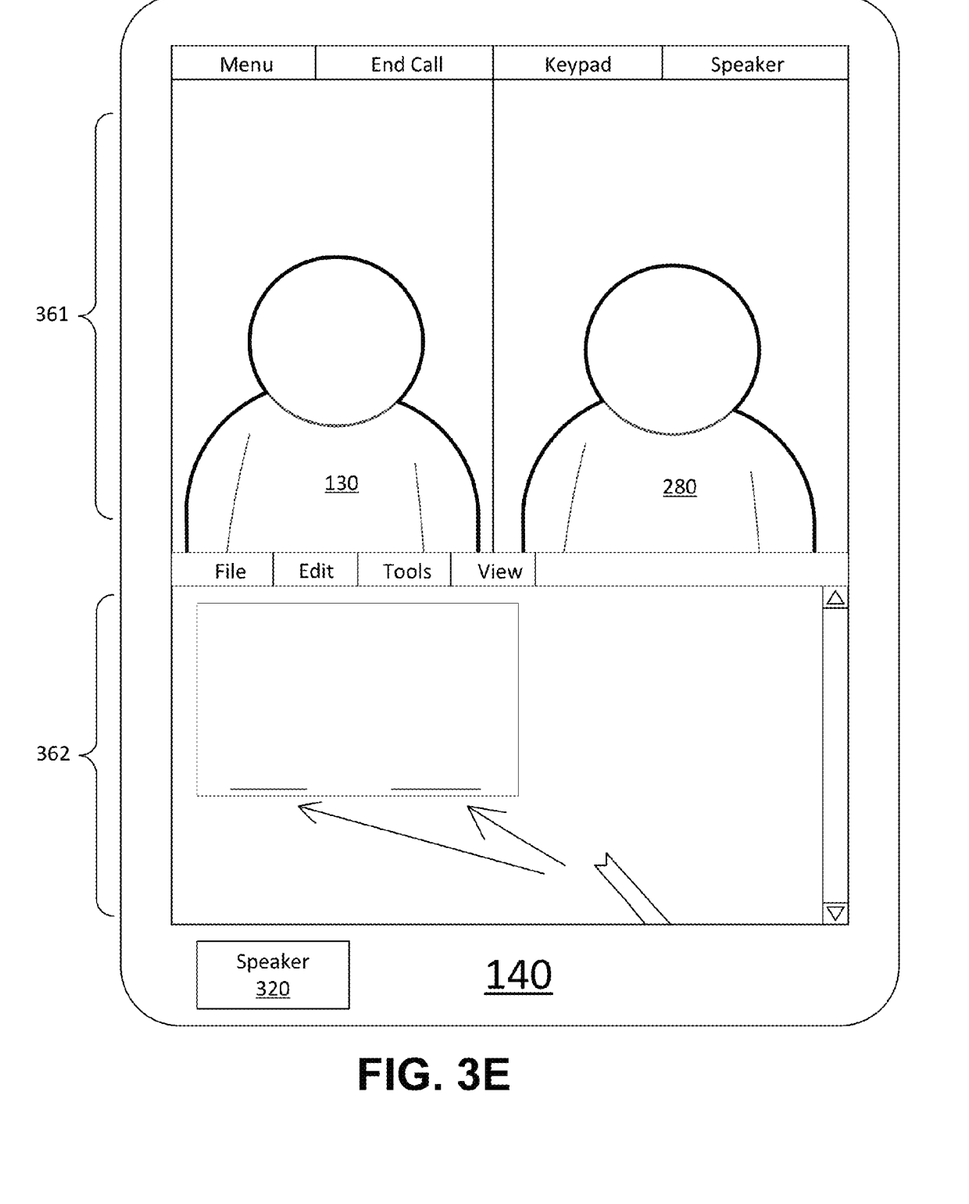
FIG. 3E is an example diagram of a mobile device in accordance with one embodiment.

As shown in FIG. 3E, in some examples, a collaborative user interface such as a virtual white-board collaborative area 362 is provided for users 130 and 280. There, users 130 and 280 can share sketches and drawings. In some embodiments, a screen on a mobile device 140 may be split such that users 130 and 280 may participate in a video conference 361 while using a collaborative area 362. In the example shown in FIG. 3E, one of the users 130 is drawing a picture of removing an access panel with a pry bar.

In one embodiment, a system comprises an "expert mode." In other words, in one embodiment mobile device 140 may suggest similar work/jobs as the work being performed by user 130. In an example, similar work/jobs may be based on information including, but not limited to: tools used, dates, companies, manufacturers, areas of technology, etc. In an embodiment, similar work that was previously performed is presented to a user 130 along with information about the technician that performed the similar work. Information about the technician that performed the similar work may include, but is not limited to: the date(s) the work was performed, the tools used, annotations made, contact information, current location (e.g., displayed on a map), etc. Once a user 130 has gathered desired information from an "expert mode," user 130 may utilize any of the other functionalities of the systems, methods, and devices described herein.

Example Methods of Use

Figure 4:
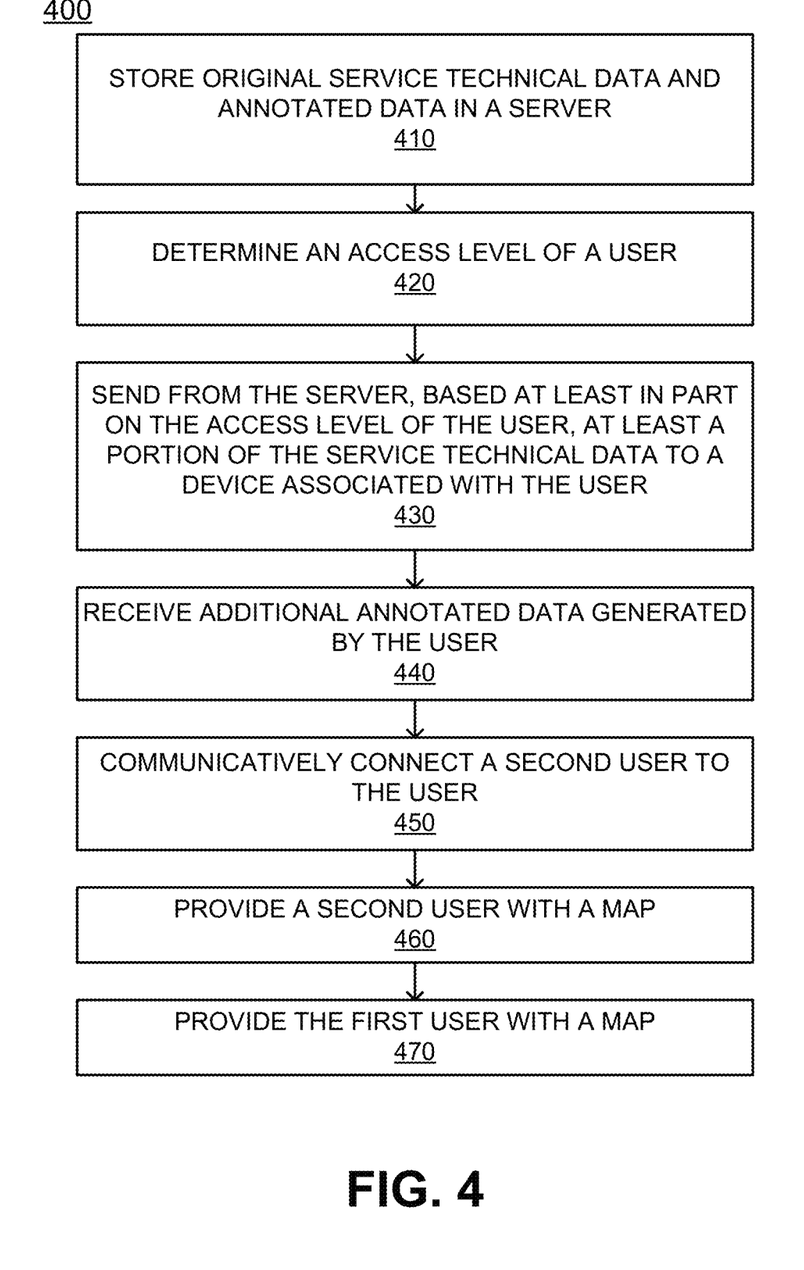
FIG. 4 is an example flowchart for providing a user with data in accordance with one embodiment.
Figure 5:
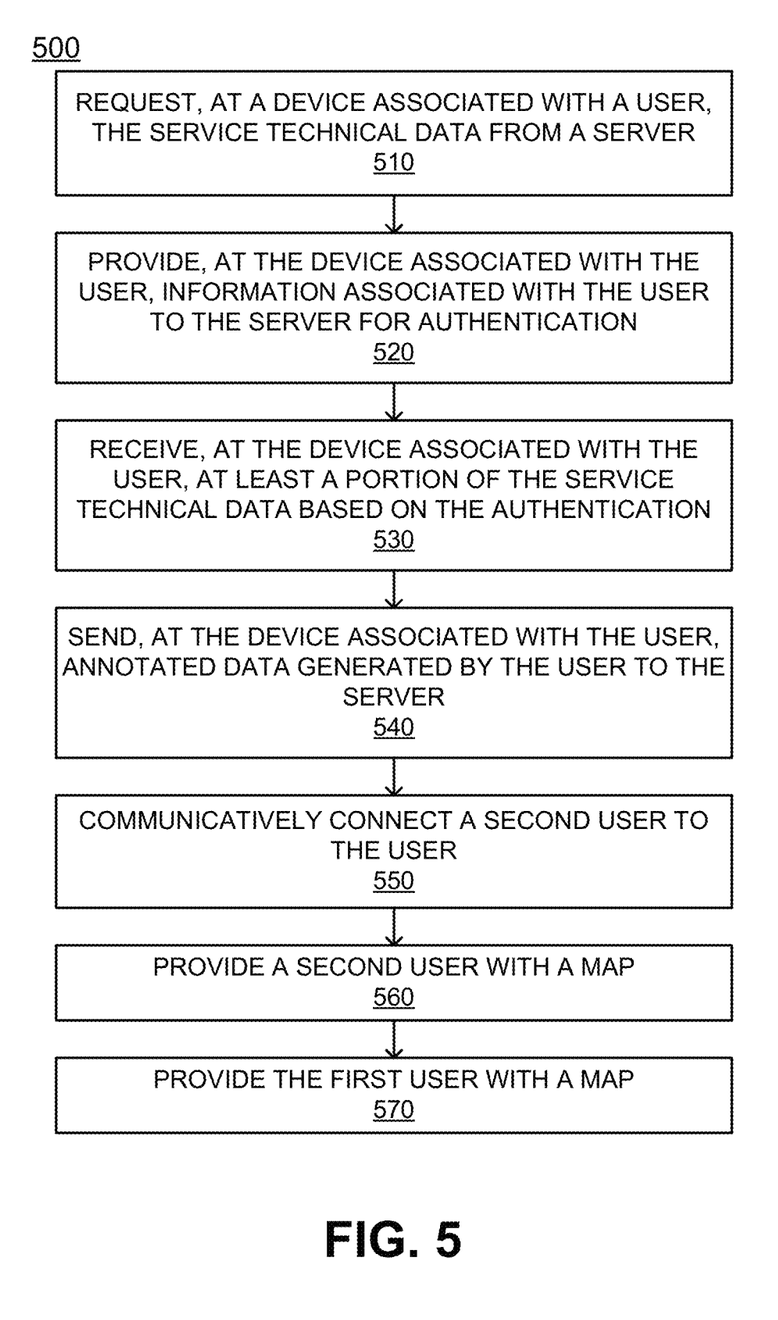
FIG. 5 is example flowchart for providing a user with data accordance with embodiments.
Figure 6:
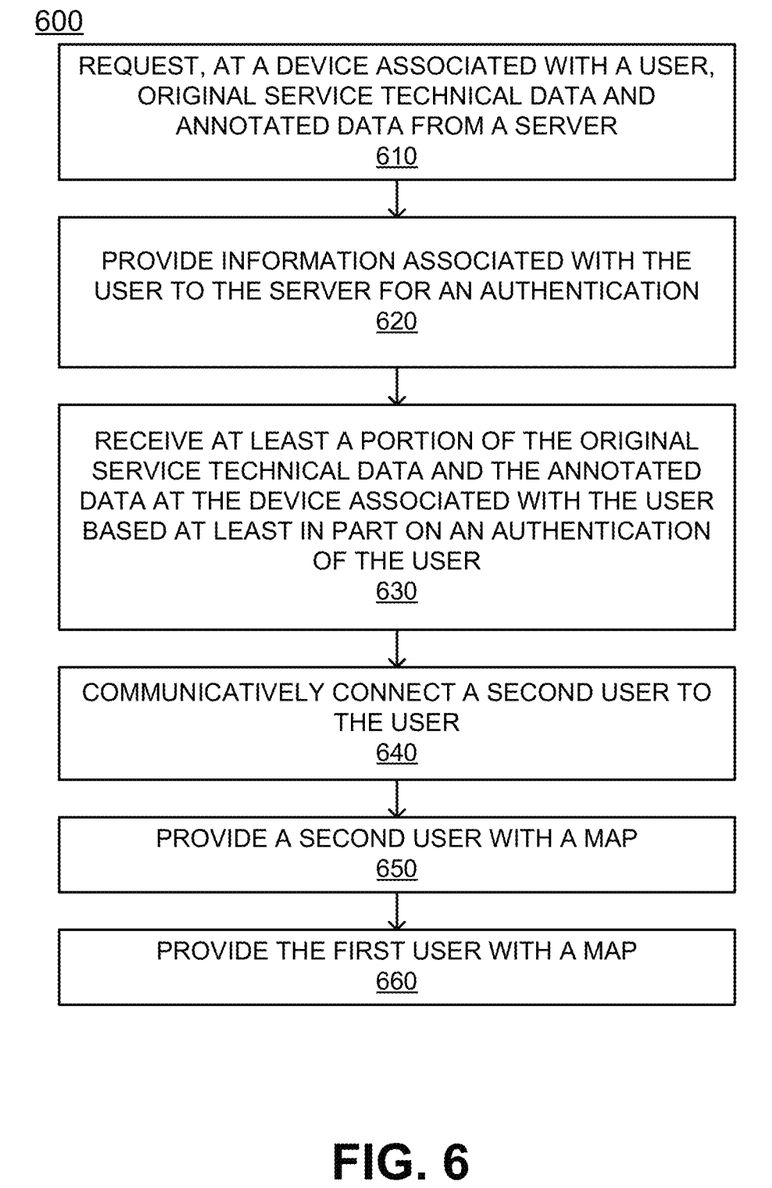
FIG. 6 is example flowchart for providing a user with data accordance with embodiments.

The following discussion sets forth in detail the operation of some example methods of operation of embodiments. FIGS. 4, 5 and 6 illustrate example procedures used by various embodiments. Flow diagrams 400, 500 and 600 include some procedures that, in various embodiments, are carried out by one or more of the electronic devices illustrated in FIG. 1, FIG. 2, FIGS. 3A-3E, FIG. 7, or a processor under the control of computer-readable and computer-executable instructions. In this fashion, procedures described herein and in conjunction with flow diagrams 400, 500 and 600 are or may be implemented using a computer, in various embodiments. The computer-readable and computer-executable instructions can reside in any tangible computer readable storage media, such as, for example, in data storage features such as RAM 708, ROM 710, and/or storage device 712 (all of FIG. 7). The computer-readable and computer-executable instructions, which reside on tangible computer readable storage media, are used to control or operate in conjunction with, for example, one or some combination of processor 706A, or other similar processor(s) 706B and 706C. Although specific procedures are disclosed in flow diagrams 400, 500 and 600, such procedures are examples. That is, embodiments are well suited to performing various other procedures or variations of the procedures recited in flow diagrams 400, 500 and 600. Likewise, in some embodiments, the procedures in flow diagrams 400, 500 and 600 may be performed in an order different than presented and/or not all of the procedures described in one or more of these flow diagrams may be performed, and/or one or more additional operations may be added. It is further appreciated that procedures described in flow diagrams 400, 500 and 600 may be implemented in hardware, or a combination of hardware, with either or both of firmware and software.

FIG. 4 is a flow diagram 400 of an example method of providing a user with service technical data 247, in accordance with one embodiment.

In operation 410, in one embodiment, original service technical data 248 and annotated data 249 are stored in a server 110. In an embodiment, original service technical data 248 is unmodified by users 130 while annotated data 249 is added and/or edited by users 130.

In operation 420, in one embodiment, an access level of a user 130 is determined. In some embodiments an access level is determined by server 110. In some embodiments an access level is determined by mobile device 140. In some embodiments an access level may be determined by a user 130 entering a unique password into a mobile device 140, or by a user 130 entering some type of biometric information into mobile device 140.

In operation 430, in one embodiment, at least a portion of the service technical data 247 is sent from server 110 to a device 140 associated with user 130. In an embodiment, service technical data 247 is sent by service technical data sending module 292. In an embodiment service technical data 247 is sent after a user 130 requests service technical data 247. In some embodiments, after a user 130 is assigned a task by a supervisor service technical data 247 is downloaded automatically to the mobile device 140.

In operation 440, in one embodiment, additional annotated data 249 generated by user 130 is received by server 110. In an embodiment, annotated data 249 is received by receiving module 293. Additional annotated data 249 may be audio or visual. In some embodiments annotated data 249 may be text, voice, and/or video. In an embodiment user 130 may upload the annotated data 249 and tag it such that the annotated data 249 is associated with a community 251, a type of manufacturer, a particular task, a particular tool, a particular apparatus 150, etc.

In operation 450, in one embodiment, server 110 communicatively connects to a second user 130. In some embodiments this is performed automatically by server 110 when user 130 requests to connect with a second user 280. In some embodiments server 110 provides user 130 with contact information for a second user 280. In some embodiments, server 110 determines the capabilities of each of the mobile devices 140 belonging to the users 130/280 and connects them such that they may communicate via text, audio, or audio and visual based upon the capabilities of the devices 140.

In operation 460, in one embodiment, server 110 provides user 130 with a map of users 341. In some embodiments this map comprises the location of any user 130/280 that has generated any annotated data 249 received by the user 130 requesting the map. By indicating which user 130 added the annotated data 249, user 130 can quickly and efficiently determine who to contact to retrieve information.

In operation 470, in one embodiment, server 110 provides user 130 with a map of stores 351. In some embodiments this map comprises a location of a store where a part required by service technical data 247 can be acquired. In some embodiments the map provides the location of multiple stores where a part may be acquired. The map may include directions, travel time, and turn-by-turn instructions on how to arrive at a store. In some embodiments the map may include the locations and/or names/identifications of other users 130 that have the part, or in some embodiments vehicle, user 130 is searching for.

FIG. 5 is a flow diagram 500 of an example method of receiving service technical data, in accordance with one embodiment.

In operation 510, in one embodiment, service technical data 247 is requested from a server 110 by a device 140 associated with a user 130. In some embodiments this request is performed by user 130, while in other embodiments this request is performed automatically. For example, the request may be made when an user 130 receives an assignment.

In operation 520, in one embodiment, information associated with user 130 is provided by the device 140 associated with the user 130 to the server 110 for authentication via authentication module 291. This information may include, but is not limited to: user 130 identification, user 130 permissions, user 130 personal information, user 130 security level, passwords, user 130 technical level, a hierarchy, device 140 identification, etc.

In operation 530, in one embodiment, at least a portion of the service technical data 247 is received by the device 140 associated with user 130 based on an authentication provided by authentication module 291. In one embodiment, service technical data 247 is sent by server 110 with service technical data sending module 292. In one embodiment service technical data 247 is not sent to mobile device 140 if user 130 has not been authenticated. In some embodiments device 140 will stop functioning if the proper authorization is not provided to either server 110 or device 140.

In operation 540, annotated data 249 generated by user 130 is sent to the server 110. In an embodiment, server 110 receives data with receiving module 293. As discussed above, annotated data 249 may be associated with various items in the knowledge community 250, including communities 251. Communities 251 may comprise a type of tool, a type of task, a particular apparatus, etc.

In operation 550, in one embodiment, a second user 280 is communicatively connected to a first user 130. In one embodiment second user 280 previously uploaded annotated data 249 and user 130 connects to second user 280. Second user 280 may provide advice or explanation to user 130 about the annotation second user 280 made. In one embodiment second user 280 may not have made an annotation, but is located closely to user 130 as shown by a map. In one embodiment a screen indicates that second user 280 has certain technical skills. In one example, user 130 can connect via text, voice or video to communicate with second user 280.

In operation 560, in one embodiment, a user 130 is provided with a map of users 341 that comprises the location of other users 280. In one embodiment the map indicates whether the user 130 that provided annotated data 249 is available, busy, online, offline, etc.

In operation 570, in one embodiment, a user 130 is provided with a map of stores 351 that comprises a location of a store where a part required by service technical data 247 data can be acquired. In some embodiments the map provides the location of a plurality of stores where a part may be acquired. The map may include directions, travel time, and turn-by-turn instructions on how to arrive at a store. In some embodiments the map may include the locations and/or names/identifications of other users 130 that have the part user 130 is searching for.

FIG. 6 is a flow diagram 600 of an example method for receiving service technical data 247, in accordance with one embodiment.

In operation 610, in one embodiment, original service technical data 248 and annotated data 249 is requested from a server 110 by a device 140 associated with a user 130. In some embodiments this request is performed by user 130, while in other embodiments this request is performed automatically. For example, the request may be made when a user 130 receives an assignment. In one embodiment, service technical data 247 is downloaded to a device 140 upon a command from a backend of an application.

In operation 620, in one embodiment, information associated with the user 130 is provided to the server 110 for authentication provided by authentication module 291. This information may include, but is not limited to: user 130 identification, user 130 permissions, user 130 personal information, user 130 security level, passwords, user 130 technical level, a hierarchy, device 140 identification, etc.

In operation 630, in one embodiment, at least a portion of the original service technical data 248 and the annotated data 249 is received at the device 140 associated with user 130 based at least in part on an authentication of user 130. In an embodiment, original service technical data 248 and annotated data 249 may be received by receiving module 293. For example, in one embodiment service technical data 247 will not be received by mobile device 140 if user 130 has not been authenticated. In some embodiments device 140 will stop functioning if the proper authorization is not provided to server 110 or mobile device 140.

In operation 640, in one embodiment, a second user 280 is communicatively connected to a first user 130. As discussed above, in an embodiment a second user 280 is connected to a user 130 to discuss problems and provide advice. In some embodiments a second user 280 may be a supervisor, a manufacturer, a service provider, a third party, etc.

In operation 650, in one embodiment, a user 130 is provided with a map of users 341 that comprises the location of any user 280. As discussed above, in some embodiments users 130 and 280 may be connected communicatively via their mobile devices 140 or they may connect via another device.

In operation 660, in one embodiment, a user 130 is provided with a map of stores 351 that comprises a location of a store where a part required by service technical data 247 can be acquired. In some embodiments the map provides the location of a plurality of stores where a part may be acquired. The map may include directions, travel time, and turn-by-turn instructions on how to arrive at a store. In some embodiments the map may include the locations and/or names/identifications of other users 130 that have the part user 130 is searching for.

Example Electronic Environment

With reference now to FIG. 7, all or portions of some embodiments described herein are composed of computer-readable and computer-executable instructions that reside, for example, in computer-usable/computer-readable storage media of server/electronic environment 700. That is, FIG. 7 illustrates one example of a type of server/electronic environment 700 that can be used in accordance with or to implement various embodiments which are discussed herein. In some embodiments portions or all of the electronic environment 700 may be implemented in server 110 and/or device 140. For the purposes of this disclosure electronic environment 700 and server 110 will be used interchangeably. However, it is appreciated that server 110 as shown in FIG. 7 is only an example and that embodiments as described herein can operate in conjunction with a number of different computer systems including, but not limited to: mobile devices 140, general purpose networked computer systems, embedded computer systems, routers, switches, server devices, client devices, various intermediate devices/nodes, stand alone computer systems, media centers, handheld computer systems, multi-media devices, and the like. Server 110 is well adapted to having peripheral tangible computer-readable storage media 702 such as, for example, a floppy disk, a compact disk, digital versatile disk, other disk based storage, universal serial bus "thumb" drive, removable memory card, and the like coupled thereto. The tangible computer-readable storage media is non-transitory in nature.

Server 110, in one embodiment, includes an address/data bus 704 for communicating information, and a processor 706A coupled with bus 704 for processing information and instructions. As depicted in FIG. 7, server 110 is also well suited to a multi-processor environment in which a plurality of processors 706A, 706B, and 706C are present. As discussed herein, in an embodiment server 110 may comprise a plurality of machines comprising a plurality of processors. Conversely, server 110 is also well suited to having a single processor such as, for example, processor 706A. Processors 706A, 706B, and 706C may be any of various types of microprocessors. Server 110 also includes data storage features such as a computer usable volatile memory 708, e.g., random access memory (RAM), coupled with bus 704 for storing information and instructions for processors 706A, 706B, and 706C. Server 110 also includes computer usable non-volatile memory 710, e.g., read only memory (ROM), coupled with bus 704 for storing static information and instructions for processors 706A, 706B, and 706C. Also present in server 110 is a data storage unit 712 (e.g., a magnetic or optical disk and disk drive) coupled with bus 704 for storing information and instructions. Server 110 may also include an alphanumeric input device 714 including alphanumeric and function keys coupled with bus 704 for communicating information and command selections to processor 706A or processors 706A, 706B, and 706C. Server 110 may also include a cursor control device 716 coupled with bus 704 for communicating user 130 input information and command selections to processor 706A or processors 706A, 706B, and 706C. In one embodiment, server 110 may also include a display device 718 coupled with bus 704 for displaying information.

Referring still to FIG. 7, in one embodiment display device 718 of FIG. 7 may be a liquid crystal device, light emitting diode device, cathode ray tube, plasma display device or other display device suitable for creating graphic images and alphanumeric characters recognizable to user 130. In one embodiment, cursor control device 716 allows user 130 to dynamically signal the movement of a visible symbol (cursor) on a display screen of display device 718 and indicate user 130 selections of selectable items displayed on display device 718. Many implementations of cursor control service 716 are known in the art including a trackball, mouse, touch pad, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Server 110 is also well suited to having a cursor directed by other means such as, for example, voice commands. Server 110 also includes an input/output (I/O) device 720 for coupling system 700 with external devices and systems such as external systems 260. For example, in one embodiment, I/O device 720 is a wireless card or chip for enabling wireless communications between server 110 and mobile device 140. Server 110 and mobile device 140 may include other input/output devices not shown in FIG. 7. For example, in one embodiment device 140 includes a microphone. In one embodiment, device 140 includes a depth/image capture device used for capturing depth data and/or image data.

Referring still to FIG. 7, various other components are depicted. communicatively Specifically, when present, an operating system 722, applications 724, modules 726, service technical data 247, original service technical data 248, and annotated data 249 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Embodiments of the present technology are thus described. While the present technology has been described in particular embodiments, it should be appreciated that the present technology should not be construed as limited by such embodiments, but rather construed according to the following claims.

What is claimed is:

1. A method for providing a user with service technical data comprising:
storing original service technical data about a type of apparatus and annotated data in a server, wherein said annotated data is associated with said original service technical data, wherein said annotated data is associated with a plurality of corresponding tags that can be used to organize said annotated data and can be used to search said annotated data for resolving problems associated with said type of apparatus;
determining an access level of said user, wherein said access level determines what service technical data said server may send;
sending from said server, based at least in part on said access level of said user, at least a portion of said service technical data to a device associated with said user; and
receiving additional annotated data generated by said user about said type of apparatus, wherein said additional annotated data is associated with said original service technical data about the type of apparatus.

2. The method of claim 1 further comprising:
communicatively connecting a second user to said user.

3. The method of claim 1 further comprising:
providing a second user with a map of users, wherein said map comprises a location of any user that has generated any annotated data received by said second user.

4. The method of claim 1 further comprising:
providing said user with a map of stores, wherein said map comprises a location of a store where a part required by said service technical data can be acquired.

5. The method of claim 1 wherein said service technical data comprises said original service technical data.

6. The method of claim 1 wherein said service technical data comprises said annotated data.

7. The method of claim 1 wherein said service technical data comprises said original service technical data and said annotated data.

8. The method of claim 1 wherein said service technical data comprises information associated with an apparatus.

9. A method for receiving service technical data comprising:
requesting, at a device associated with a user, said service technical data from a server about a type of apparatus;
providing, at said device associated with said user, information associated with said user to said server for an authentication;
receiving, at said device associated with said user, at least a portion of said service technical data about the type of apparatus based on said authentication; and
sending, at said device associated with said user, annotated data about the type of apparatus generated by said user to said server, wherein said annotated data is associated with original service technical data and wherein said annotated data is associated with a plurality of corresponding tags that can be used to organize said annotated data and can be used to search said annotated data for resolving problems associated with said type of apparatus.

10. The method of claim 9 further comprising:
communicatively connecting a second user to said user.

11. The method of claim 9 further comprising:
providing a second user with a map of users, wherein said map comprises a location of any user that has generated any annotated data received by said second user.

12. The method of claim 9 further comprising:
providing said user with a map of stores, wherein said map comprises a location of a store where a part required by said service technical data can be acquired.

13. The method of claim 9 wherein said service technical data comprises original service technical data.

14. The method of claim 9 wherein said service technical data comprises additional annotated data, wherein said additional annotated data is associated with said original service technical data.

15. The method of claim 9 wherein said service technical data comprises original service technical data and additional annotated data, wherein said additional annotated data is associated with said original service technical data.

16. The method of claim 9 wherein said service technical data comprises information associated with repairing an apparatus.

17. A method for receiving service technical data comprising:
requesting, at a device associated with a user, original service technical data and annotated data about a type of apparatus from a server;
providing information associated with said user to said server for an authentication; and
receiving at least a portion of said original service technical data and said annotated data about the type of apparatus at said device associated with said user based at least in part on an authentication of said user, wherein said annotated data is associated with a plurality of corresponding tags that can be used to organize said annotated data and can be used to search said annotated data for resolving problems associated with said type of apparatus.

18. The method of claim 17 further comprising:
communicatively connecting said user to a second user, wherein said second user has previously sent said annotated data to said server.

19. The method of claim 17 further comprising:
providing said user with a map, wherein said map comprises a location of a second user, wherein said second user has previously annotated said service technical data in said server.

20. The method of claim 17 further comprising:
providing said user with a map, wherein said map comprises a location of a store where a part required by said service technical data can be acquired.

21. The method of claim 17 wherein said original service technical data and said annotated data comprises information associated with repairing an apparatus.

22. The method of claim 17 wherein said user sends additional annotated data to said server and wherein said server stores said additional annotated data.

23. A device for providing a user with service technical data, said device comprising:
an authentication module to authenticate information associated with said user to determine what service technical data about a type of apparatus to send to said user;
a service technical data sending module to send service technical data about the type of apparatus to said user; and
a receiving module to receive annotated data about the type of apparatus generated by said user, wherein said annotated data is associated with original service technical data and wherein said annotated data is associated with a plurality of corresponding tags by said receiving module that can be used to organize said annotated data and can be used to search said annotated data for resolving problems associated with said type of apparatus.

24. The device of claim 23 further comprising:
a community orchestrator to communicatively connect a second user to said user.

25. The device of claim 23 further comprising:
a map of users to provide a second user with a map, wherein said map comprises a location of any user that has generated annotations received by said second user.

26. The device of claim 23 further comprising:
a map of stores to provide said user with a map, wherein said map comprises a location of a store.

27. The device of claim 23 wherein said service technical data comprises original service technical data.

28. The device of claim 23 wherein said service technical data comprises additional annotated data, wherein said additional annotated data is associated with said original service technical data.

29. The device of claim 23 wherein said service technical data comprises original service technical data and additional annotated data, wherein said additional annotated data is associated with said original service technical data.

30. The device of claim 23 wherein said service technical data comprises information associated with repairing an apparatus.

* * * * *